United States Patent [19]

Berger et al.

[11] Patent Number: 4,906,403
[45] Date of Patent: Mar. 6, 1990

[54] DEFOAMING AND DEAERATING COMPOSITION AND METHOD

[75] Inventors: Roland Berger, Bochum; Hans-Ferdi Fink, Essen; Wernfried Heilen, Alpen; Hubert Holthoff, Werl-Sonnern; Christian Weitemeyer, Essen, all of Fed. Rep. of Germany

[73] Assignee: Th. Goldschmidt AG, Essen, Fed. Rep. of Germany

[21] Appl. No.: 189,304

[22] Filed: May 2, 1988

[30] Foreign Application Priority Data

Jun. 3, 1987 [DE] Fed. Rep. of Germany ....... 3718588

[51] Int. Cl.$^4$ .............................................. B01D 19/04
[52] U.S. Cl. .................................... 252/321; 252/358; 525/100; 525/105
[58] Field of Search .................. 525/100, 105; 528/25; 252/321, 353

[56] References Cited

U.S. PATENT DOCUMENTS 4,520,173  5/1985  Fink et al. .

FOREIGN PATENT DOCUMENTS 2321557  2/1974  Fed. Rep. of Germany .
3218676  8/1985  Fed. Rep. of Germany .
3627782  2/1988  Fed. Rep. of Germany ...... 252/358

*Primary Examiner*—John C. Bleutge
*Assistant Examiner*—Ralph H. Dean, Jr.
*Attorney, Agent, or Firm*—Toren, McGeady & Associates

[57] ABSTRACT

A composition useful for defoaming and/or deaerating liquid organic systems, such as crude oil, hydraulic oil, lacquer, varnish and paint is disclosed. The composition comprises (a) a polydiene of the general formula $Z-[CH_2-CH=CR^1-$

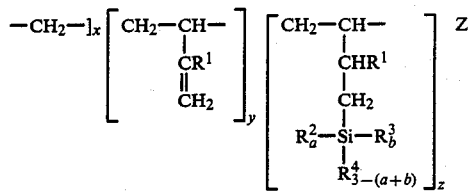

wherein
Z = a chain-terminating group
$R^1$ = hydrogen or methyl
$R^2$ = alkyl with 1 to 6 carbon atoms or phenyl
$R^3$ = the $OR^5$ group, in which $R^5$ = alkyl, the $(C_nH_{2n}O)_mR^6$ group, in which $R^6$ = alkyl, acyl or alkylaryl, n = 2 or 3 and m ≧ 1, or the $C_pF_{2p+1}(CH_2)_2$- group in which p = 4 to 16,

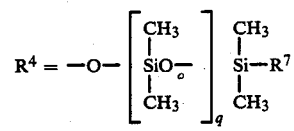

$R^7$ = alkyl with 1 to 6 carbon atoms or phenyl,
q ≧ 3,
x,y ≧ 0,
z ≧ 3,
a = 0 to 2,
b = 0 to 2, and
a+b ≦ 2, and (b) an organic solvent in which the polydiene is dissolved. A method of deformation and/or deaerating organic systems with such polydienes is also disclosed.

2 Claims, No Drawings

DEFOAMING AND DEAERATING COMPOSITION AND METHOD

FIELD OF THE INVENTION

This invention relates generally to defoaming and deaerating compositions useful for defoaming and/or deaerating organic systems and is particularly directed to such compositions which contain as active ingredient organosilicon - modified polydienes.

Considered from another aspect, the invention is directed to a method of defoaming and/or deaerating organic systems with defoaming and deaerating agents which essentially consists of organosilicon-modified polydienes or with compositions containing such agents as active ingredient.

For the purpose of this invention:

(a) a defoaming product is a compound or a composition which is able to destroy foam bubbles with lamellar walls which are present in a liquid system, or to prevent their formation. The destruction of the bubbles takes place preferably on the surface of the liquid system.

(b) a deaerating product is a compound or composition which is suitable for inducing small gas bubbles, contained in a liquid system, to rise to the surface, whereupon these small gas bubbles burst at the surface.

During defoaming, the walls separating the individual foam bubbles are destroyed or their stable development is prevented. The foam bubbles generally have a polyhedral structure. The gas bubbles which are to be eliminated by deaeration generally are significantly smaller, are spherical and are separated so far from one another that lamellae are not formed between individual adjacent gas bubbles.

The defoaming of organic systems is particularly directed to the defoaming of freshly extracted crude oil which is degassed by the release of pressure and to the defoaming or prevention of the formation of foam during the further processing, especially while refining by distillation the crude oil and crude oil products. Defoaming products, moreover, are required for defoaming mineral oils or preparations which contain mineral oils.

Deaerating products are used to improve the so-called air separation capabilities in mineral oils and the preparations, such as hydraulic oils. A further area of application for deaerating products in organic systems is the deaerating of coating systems, such as lacquers, varnishes or organosols.

Because of differences in their formation, development and structure, lamellar foams and microfoams generally require, for destruction or prevention of formation, products which differ in their structure. Moreover, the chemical structure of the defoaming and deaerating products must be adapted to the system in which they are to be used so that they can be dispersed or distributed in the required manner in the system and become most effective.

BACKGROUND INFORMATION AND PRIOR ART

German Pat. No. 32 18 676 discloses deaerating agents for aqueous coating systems with polymeric organic film formers. The agents contain 5 to 60% by weight of a linear polymer dissolved in an organic solvent, the polymer having at least 5 laterally bonded groups, each of which contains a silicon atom which is linked over a bivalent hydrocarbon group to the polymer. At least one group of the formula $O\text{-}[C_nH_{2n}O\text{-}]_xQ$ is attached to the silicon atom. In this group, $n=2$ to 8, $x$ - 1 to 10, Q is an alkyl group with 1 to 18 carbon atoms, an aryl group, an alkaryl group or an aryl group with 2 to 18 carbon atoms and the sum of the carbon and oxygen atoms of the $R^1$ group is $\geq 5$.

An agent is preferred which contains a compound of formula

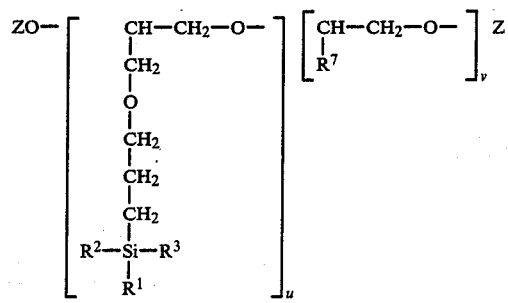

as linear polymer, wherein $R^1$ has the above meaning and $R^2$ and $R^3$ are the same or different and represent, for example, a methyl group, Z are terminal groups, $R^7$ may be hydrogen or, for example, an alkyl group, $u \geq 5$ and the ratio $u/v \geq 0.4$.

These agents have proven their value for the elimination of so-called microfoam and thus as deaerating agents. They are, however, only moderately effective as defoamers for organic systems.

In German Offenlegungsschrift No. 23 21 557, a method is described for the synthesis of block copolymers with polyether and, optionally, partially hydrogenated polydiene blocks which are connected to one another over organosilicon bridging elements. These block copolymers are used as additives for the preparation of polyurethane foams, stabilizing the foam formed and counteracting the collapse of the foam. The block copolymers are also intended to be used as release agents, demulsifiers and textile preparation agents and in cosmetics. In cosmetic preparations, they are said to improve the sliding ability and affect the consistency of creams and ointments.

Surprisingly, it has now been discovered that such compounds are particularly effective as defoamers and/or deaerating agents in organic systems, such as crude oil, mineral oil, paints and lacquers. The structure of these compounds is so variable that it can be adapted to the system in which the compounds are to be used. For example, the solubility of the block copolymer in the organic system can be adjusted in the desired manner by means of the ratio of the polysiloxane blocks to the organic carbon portion, especially the polyether blocks.

OBJECTS OF THE INVENTION

It is the primary object of the present invention to provide defoaming and deaerating compositions for effectively defoaming and/or deaerating organic systems of the indicated kind.

It is also an object of the invention to provide a simple and highly effective method of defoaming and/or deaerating such organic systems.

Generally, it is an object of the invention to improve upon the art of defoaming and deaerating.

SUMMARY OF THE INVENTION

The inventive defoaming and deaerating composition comprises as active ingredient an effective amount of a compound of the general formula

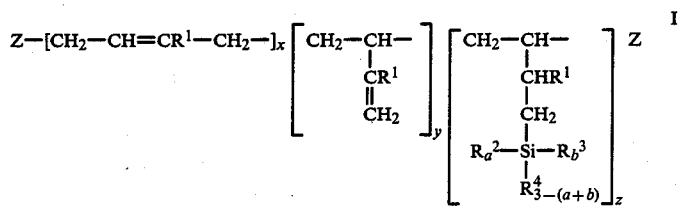

I wherein
- Z is a group which terminates the polydiene chain and originates from the manner in which the polymerization of the diene, for example, 1,3-butadiene, is carried out. Examples of such Z groups are hydrogen or OH groups,
- $R^1$ is hydrogen or a methyl group,
- $R^2$ is an alkyl group with 1 to 6 carbon atoms or the phenyl group. Methyl is the preferred alkyl group. As alkyl group, $R^2$ may, however, also represent an ethyl, propyl, butyl, isobutyl or hexyl group.
- $R^3$ is an alcohol group minus the hydrogen of the hydroxyl group of the formula $OR^5$. $R^5$ may be an alkyl group or a fluoroalkyl group having the formula $C_pF_{2p+1}(CH_2)_2$-, p being a number from 4 to 16. $R^5$ may, however, also represent the $(C_nH_{2n}O)_mR^6$ group, in which n is 2 or 3 and m is $\geq 1$. $R^6$ is an alkyl group, an acyl group or an alkylaryl group. $R^5$ preferably is an alkyl group with up to 20 carbon atoms. The $R^3$ group thus is derived from an alkanol, a fluoroalcohol or a polyoxyalkylene monool. The choice of this group affects and influences the compatibility of the polydiene to be used, pursuant to the invention, with the organic system to be defoamed or deaerated.
- $R^4$ is a polysiloxanyl group of the formula

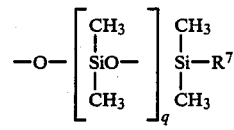

in which $R^7$ is an alkyl group with 1 to 6 carbon atoms or a phenyl group, q is equal to or greater than 3 and is preferably a multiple of the number 3. The subscript q may have a value as large as several thousand.

The subscripts x and y are equal to or greater than 0. They are formed or determined by the unmodified portions of the starting polydiene; z is $\geq 3$ and reflects the number of organosilicon-modified but must fulfill the conditions that their sum $\leq 2$. The sum of a+b preferably is 0 or 1.

Depending on the molecular weight, the organosilicon-modified polydienes are liquid to highly viscous substances. The polydiene of general formula I are present in the form of mixtures of different molecular weights. The subscripts x, y, z, and a+b may therefore also have fractional values in the general formula.

Examples of such organosilicon-modified polydienes are:

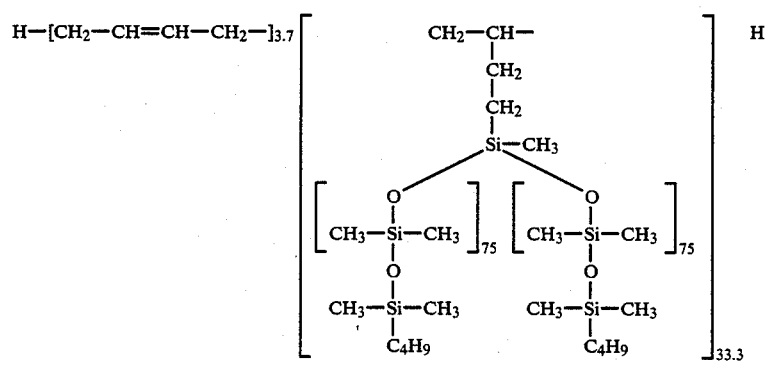

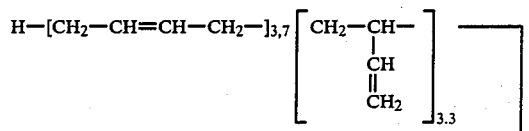

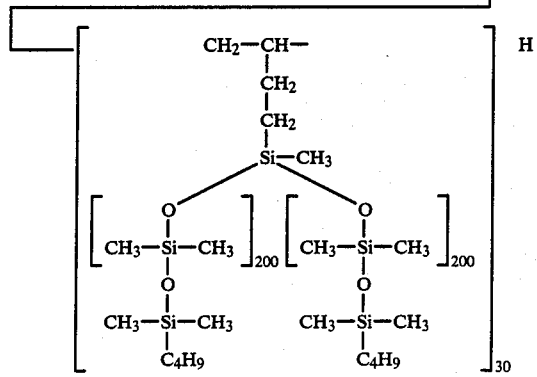

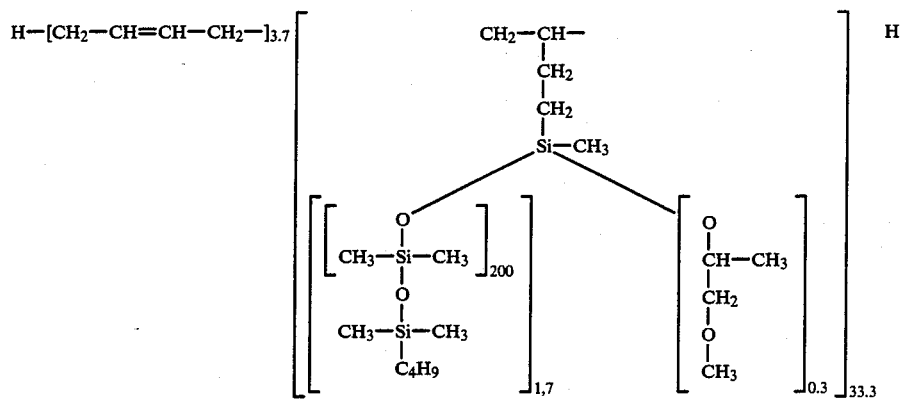

The second component of the inventive composition is a carrier or vehicle in which the above compound is dissolved. This carrier should be compatible with the organic system to be treated and is an organic solvent. Suitable solvents are aromatic hydrocarbons, such as toluene or xylene, as well as mixtures of esters and ketones.

The composition should contain 10 to 50% by weight of active compound with the remainder being solvent.

The metering and distribution of the active compound in the organic system to be treated is greatly facilitated by using the inventive composition. It has been ascertained that excellent defoaming and deaerating results are obtained if the composition is added to the organic system in such quantities that the amount of active compound in the liquid organic system is about 0.01 to 1.0 % by weight calculated on the weight of the organic system. Pursuant to the inventive method of defoaming and/or deaerating organic systems, such as crude oil, hydraulic oil, lacquers, varnishes, paints and the like, coating systems, 0.01 to 1% by weight, based on the organic system, of an organosilicon - modified polydiene of the general formula $$Z-[CH_2-CH=CR^1-$$

$$-CH_2-]_x \left[ \begin{array}{c} CH_2-CH- \\ | \\ CR^1 \\ \parallel \\ CH_2 \end{array} \right]_y \left[ \begin{array}{c} CH_2-CH- \\ | \\ CHR^1 \\ | \\ CH_2 \\ | \\ R_a^2-Si-R_b^3 \\ | \\ R^4_{3-(a+b)} \end{array} \right]_z Z$$

wherein
Z = a chain-terminating group
$R^1$ = hydrogen or a methyl group
$R^2$ = an alkyl group with 1 to 6 carbon atoms or the phenyl group
$R^3$ = the $OR^5$ group, in which $R^5$ = alkyl, the $(C_nH_{2n}O)_mR^6$ group, in which $R^6$ = alkyl, acyl or alkylaryl, n = 2 or 3 and m $\geq$ 1, or the $C_pF_{2p+1}(CH_2)_2$- group in which p = 4 to 16,

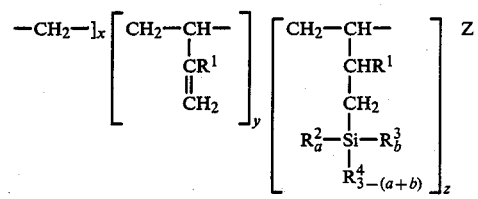

$R^7$ alkyl with 1 to 6 carbon atoms or phenyl, q $\geq$ 3, x, y ≧ 0,
z ≧ 3,
a = 0 to 2,
b = 0 to 2, and
a + b ≧ 2,
is added to and distributed within the organic system.

The compound may be added to the organic system in the form of the inventive composition as described above, in which event, the amount of composition admixed to the organic system should be such that the amount of active compound within the organic system is 0.1 to 1% by weight, calculated on the system.

As stated, the metering and dispersion of the block copolymers is facilitated by using a composition. The solvents must be compatible with the system that is to be defoamed or deaerated. Suitable solvents, as indicated, are aromatic hydrocarbons, such as toluene or xylene, as well as mixtures of esters and ketones.

The defoaming and deaerating agent or composition can be used for different types of organic systems, the following systems being singled out as preferred examples: mineral oils, which are used as hydraulic oils; crude oil, extracted from the ground and containing natural gas; lacquers and paints, which contain synthetic resins such as the following, dissolved in solvents: polyvinyl chloride, copolymers of vinyl chloride, vinyl acetate and maleic acid, oil-free polyesters, acid-curing combinations of alkyd resins, melamine resins and nitrocellulose.

The copolymers are preferably used in these systems in amounts of 0.01 to 1.0% by weight, based on the organic systems.

The application properties of the organic systems to which the organosilicon - modified polydienes have been added generally are not adversely affected.

The invention will be described in more detail by the following Examples. It should be understood that these Examples are given by way of illustration and not by way of limitation.

EXAMPLES

In the following examples, the synthesis of the active compounds, which is known in the art, and the use of the compounds as defoamers and deaerating agents is shown in greater detail.

I. Synthesis of the Compounds to be Used Pursuant to the Invention

In a reactor equipped with stirrer, reflux condenser, thermometer and dropping funnel, 2,000 g of 1,2-polybutadiene, having an equivalent weight of 60.14 g based on the vinyl group content and an average formula corresponding to

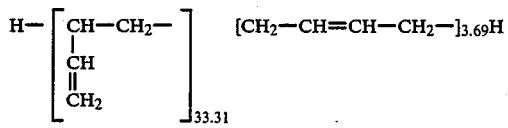

is dissolved in 6,400 g of toluene. This solution is heated with stirring to 60° C. and mixed at this temperature with 500 mg of hexachloroplatinic acid which is dissolved in 4 moles of tetrahydrofuran (catalyst solution). It is then heated to 75° C. whereupon, 4,208 g of methylhydrogendichlorosilane (that is, 110% of the amount required for addition to the vinyl groups) is allowed to flow in slowly. The rate of addition is adjusted so that the temperature of the reactor contents does not exceed 100° C. At the end of the silane addition, the reaction material is kept for 1 hour at 100° C. to complete the reaction. The excess methylhydrogendichlorosilane and a portion of the toluene are then distilled off. The distillation is ended when the temperature at the vapor transfer reaches a value of 110° C. The contents of the reactor are cooled and the solids content of the toluene solution of the reaction material and the hydrlyzable chlorine content, expressed as the acid value in mval g of solids, are determined.

The solution of the reaction product has a solids content of 42.4% and an acid value of 11.20 mval/g, based on the solvent-free product. From this it can be calculated that the equivalent weight of the solid material is 89.28 g.

For the synthesis of compounds of formula

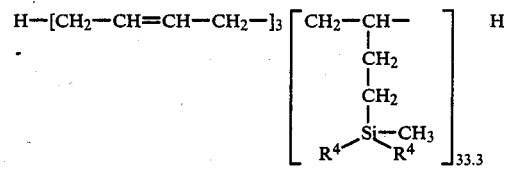

89.28 g of solid material, corresponding to 210.6 g of the 42.4% solution of the methylhydrogendichlorosilane adduct to 1,2-polybutadiene described above was added to a reactor equipped with stirrer, thermometer, reflux condenser and dropping funnel. A 30% solution of lithium siloxanolate in toluene is allowed to flow in at 70° C. over a period of 1 hour. In each case, 1 equivalent of the lithium siloxanolate is used per equivalent of the adduct described above. At the end of the dropwise addition, heating is continued for a further hour at 70° C. to complete the reaction. The temperature is then lowered to 40° C. and the lithium chloride formed is removed by filtration. After determining the solids content, the filtrate is adjusted to a solids content of 25% with toluene.

A series of compounds produced by this method is listed in the following:

| Compound | $R^4 =$ |
|---|---|
| 1 a | $-O-\left[\begin{array}{c} CH_3 \\ / \\ Si-O- \\ \backslash \\ CH_3 \end{array}\right]_{20} \begin{array}{c} CH_3 \\ / \\ Si-C_4H_9 \\ \backslash \\ CH_3 \end{array}$ |
| 1 b | $-O-\left[\begin{array}{c} CH_3 \\ / \\ Si-O- \\ \backslash \\ CH_3 \end{array}\right]_{100} \begin{array}{c} CH_3 \\ / \\ Si-C_4H_9 \\ \backslash \\ CH_3 \end{array}$ |
| 1 c | $-O-\left[\begin{array}{c} CH_3 \\ / \\ Si-O- \\ \backslash \\ CH_3 \end{array}\right]_{200} \begin{array}{c} CH_3 \\ / \\ Si-C_4H_9 \\ \backslash \\ CH_3 \end{array}$ |

| Compound | $R^4 =$ |
|---|---|
| 1 d | $-O-\left[\begin{array}{c}\phantom{x}\\ Si\\ \phantom{x}\end{array}\begin{array}{c}CH_3\\ -O-\\ CH_3\end{array}\right]_{1000} Si\begin{array}{c}CH_3\\ -C_4H_9\\ CH_3\end{array}$ |

II. Use of the Compounds As Defoamers and Deaerating Agents

1. Polymers 1a to 1d are incorporated into a chlorinated rubber lacquer of the following composition in concentrations of 0.1% and 0.2% of the 25% solution of the compounds that are to be used pursuant to the invention:

Pergut S 10: 10.9% by weight
Alkyldal F 48 (65%): 16.8% by weight
Leromoll 211: 3.0% by weight
Palatinol C: 2.7% by weight
Soybean lecithin: 0.2% by weight
Bentone paste (10%): 1.75% by weight
Bayferrox 130 M: 15.8% by weight
Barium sulfate EWO: 25.4% by weight
Hardener: 1.25% by weight
Xylene: 20.8% by weight The lacquer batches were investigated by three different methods which are described in the following.

1(a) Foam Formation

Lacquer (100 g) is weighed into a plastic beaker with a diameter of 6 cm and stirred for 1 minute with a turbine (having a diameter of 4 cm) at a rate of 2,500 revolutions per minute. The amount of air, so stirred into the lacquer, is determined by weighing out 50 mL of the stirred lacquer. The volume proportion of enclosed air bubbles is calculated using the following formula:

$$\% \text{ by volume} = 2\left[50 - \frac{\text{weight of 50 mL of the stirred lacquer}}{\text{weight of 50 mL of lacquer not stirred}}\right]$$

1(b) Foam Collapse

In the same manner, stirred lacquer, immediately after the air is stirred into its, is poured onto a glass plate lying on an inclined plane which deviates by 25° from the vertical. After the lacquer layer has dried, the lacquer film is evaluated optically and the bubbles visible on the surface or the surface disorders per unit surface area are counted.

1(c) Deaeration

A lacquer film, 250 μm thick in the wet state, is applied with a doctor blade on a carefully degreased glass plate. After the film has dried, the lacquer layer is transilluminated from below with a strong light source. Pinholes, which are attributable to microfoam, become clearly visible and can be counted. The number of pinholes per 100 cm² is a measure of the deaerating effect of the active ingredients added to the lacquer.

A commercial product which acts as a defoamer or deaerating agent and which is based on a siloxane carrying fluoroalkyl group is used for comparison.

The test results are summarized in Table 1.

TABLE 1

| Compound | | Stirring Test % Air by Vol. | Foam Collapse No. of Bubbles | Deaeration No. of Pinholes |
|---|---|---|---|---|
| no additive | | 4.9 | 260 | cannot be counted |
| 1a | 0.1% | 3.2 | 38 | no pinholes |
| 1a | 0.2% | 2.9 | 17 | down to substrate, some microcraters identifiable on the surface |
| 1b | 0.1% | 3.1 | 4 | isolated pinholes |
| 1b | 0.2% | 2.8 | 4 | isolated pinholes |
| 1c | 0.1% | 3.1 | 0 | 0 |
| 1c | 0.2% | 2.6 | 0 | 0 |
| 1d | 0.1% | 2.9 | 0 | 0 |
| 1d | 0.2% | 2.6 | 0 | 0 |
| Comparison | | | | |
| | 0.1% | 2.9 | 220 | 78 |
| | 0.4% | 2.8 | 156 | 46 |

2. The compounds are tested in the manner described in a clear vinyl resin lacquer which can be used to coat wood. The lacquer has the following composition:

Vinylite VMCC: 20.0 parts by weight
Ethyl glycol acetate: 56.0 parts by weight
Methyl isobutyl ketone: 8.0 parts by weight
Xylene: 1.0 parts by weight
Tego Glide 410 (10% in xylene): 0.5 parts by weight The compounds to be used pursuant to the invention are, however, added to 25% solutions in amounts of 0.1% and 0.2%.

The results are summarized in Table 2.

TABLE 2

| Compound | | Stirring Test % Air by Vol. | Foam Collapse No. of Bubbles | Deaeration No. of Pinholes |
|---|---|---|---|---|
| no additive | | 12.1 | 93 | very many |
| 1a | 0.1% | 4.0 | 18 | 0 |
| 1a | 0.2% | 3.6 | 8 | 0 |
| 1b | 0.1% | 2.8 | 11 | 0 |
| 1b | 0.2% | 2.4 | 2 | 0 |
| 1c | 0.1% | 2.4 | 3 | 0 |
| 1c | 0.2% | 2.4 | 3 | 0 |
| 1d | 0.1% | 6.9 | 40 | isolated pinholes |
| 1d | 0.2% | 6.9 | 22 | isolated pinholes |

3. The compounds listed below are synthesized by the method described above.

| Compound | $R^4 =$ |
|---|---|
| 2 a | $-O-\left[\begin{array}{c}\phantom{x}\\ Si\\ \phantom{x}\end{array}\begin{array}{c}CH_3\\ -O-\\ CH_3\end{array}\right]_{500} Si\begin{array}{c}CH_3\\ -C_4H_9\\ CH_3\end{array}$ |
| 2 b | $-O-\left[\begin{array}{c}\phantom{x}\\ Si\\ \phantom{x}\end{array}\begin{array}{c}CH_3\\ -O-\\ CH_3\end{array}\right]_{1200} Si\begin{array}{c}CH_3\\ -C_4H_9\\ CH_3\end{array}$ |
| 2 c | $-O-\left[\begin{array}{c}\phantom{x}\\ Si\\ \phantom{x}\end{array}\begin{array}{c}CH_3\\ -O-\\ CH_3\end{array}\right]_{2000} Si\begin{array}{c}CH_3\\ -C_4H_9\\ CH_3\end{array}$ |

The effectiveness was tested in equipment which is specified in DIN 51 381 and comprises a thermostated sample vessel and a capillary through which air is passed. A conventional, commercial, but defoamer-free hydraulic oil (180 mL) is filled into the measuring device and thermostated to 25° C. The test sample subsequently is gassed for a period of 7 minutes through the capillary (diameter - 0.5 mm) at a pressure of 150 mm Hg. At the end of the period during which air is passed in, the capillary is removed and, on the one hand, the surface foam is evaluated and, on the other, the amount of air taken up is determined by measuring the density. The products checked are used at a concentration of 0.05% by weight (based on the active ingredient).

The results are summarized in Table 3.

TABLE 3

| Compound | Foam Height in mm | Air Content in % |
|---|---|---|
| without defoamer | 5 | 3.6 |
| dimethylpolysiloxane viscosity 60,000 mPas not of the invention | 3 | 2.5 |
| 2a | 1 | 0.9 |
| 2b | <1 | 0.8 |
| 2c | <1 | 0.6 |

What is claimed is:

1. A method for defoaming and/or deaerating organic systems selected from the group consisting of crude oil, hydraulic oil, lacquer, varnish and paint, said method comprising distributing within the organic system about 0.01 to 1.0% by weight, based on the organic system, of an organosilicon - modified polydiene of the general formula $$Z-[CH_2-CH=CR^1-$$
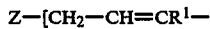
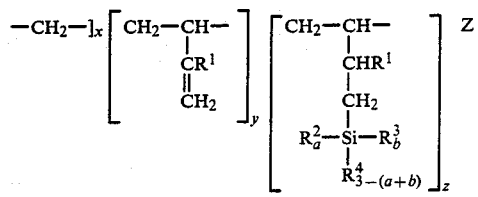

wherein
Z=hydrogen or OH;
$R^1$=hydrogen or methyl;
$R^2$=alkyl with 1 to 6 carbon atoms or phenyl;
$R^3$=the group $OR^5$ in which $R^5$=alkyl, the group $(C_nH_{2n}O)_mR^6$ in which $R^6$=alkyl, acyl or alkylaryl, n=2 or 3 and m≥1, or the group $C_pF_{2p+1}(CH_2)_2$-in which p=4 to 16,

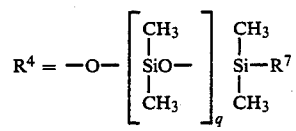

wherein
$R^7$=alkyl with 1 to 6 carbon atoms or phenyl,
q≥3,
x, y≥0,
z≥3,
a=0 to 2,
b=0 to 2, and
a+b≤2.

2. The method of claim 1, wherein the organosilicon - modified polydiene is dissolved in a solvent compatible with the organic system before the polydiene is added to the organic system.

* * * * *